United States Patent
Iwagami et al.

(10) Patent No.: US 11,588,430 B2
(45) Date of Patent: Feb. 21, 2023

(54) MOTOR CONTROL DEVICE, MOTOR UNIT, AND VEHICLE

(71) Applicant: Nidec Elesys Corporation, Kawasaki (JP)

(72) Inventors: Naoki Iwagami, Kawasaki (JP); Hisashi Takahashi, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 0 days.

(21) Appl. No.: 17/474,102

(22) Filed: Sep. 14, 2021

(65) Prior Publication Data
US 2022/0085747 A1 Mar. 17, 2022

(30) Foreign Application Priority Data
Sep. 15, 2020 (JP) .............................. JP2020-154505

(51) Int. Cl.
| | |
|---|---|
| *H02P 29/024* | (2016.01) |
| *H02P 27/08* | (2006.01) |
| *H02M 1/32* | (2007.01) |
| *B60L 15/20* | (2006.01) |
| *H02M 7/5387* | (2007.01) |
| *H02P 21/22* | (2016.01) |

(52) U.S. Cl.
CPC .......... *H02P 29/0241* (2016.02); *B60L 15/20* (2013.01); *H02M 1/32* (2013.01); *H02M 7/53871* (2013.01); *H02P 27/08* (2013.01); *H02P 21/22* (2016.02)

(58) Field of Classification Search
CPC .......... H02P 27/00; H02P 27/04; H02P 27/06; H02P 27/08; H02P 29/00; H02P 29/02; H02P 29/024; H02P 29/0243; H02P 29/025; H02P 29/026; H02P 29/027; H02P 29/032; H02P 29/60; H02P 29/40; H02P 2201/03; H02P 2207/01; H02P 2207/05; H02P 21/00; H02P 21/0003; H02P 21/20; H02P 21/22; H02P 21/30; H02P 23/00; H02P 23/0004; H02P 23/30; H02P 25/00; H02P 25/03; H02P 25/062; H02P 25/064; H02P 11/00; H02P 11/04; H02P 11/06; H02P 6/00; H02P 6/08; H02P 6/28; H02P 1/00; H02P 1/42; H02P 3/12; H02P 3/22
See application file for complete search history.

(56) References Cited

U.S. PATENT DOCUMENTS 10,291,171 B2 * 5/2019 Moritake .................. H02P 3/22

FOREIGN PATENT DOCUMENTS

| JP | 2014-217151 A | 11/2014 |
| JP | 2017-225236 A | 12/2017 |

* cited by examiner

*Primary Examiner* — Antony M Paul
(74) *Attorney, Agent, or Firm* — Keating & Bennett

(57) ABSTRACT

A motor control device includes a motor drive circuit including an upper arm and a lower arm, an arithmetic processor to control the motor drive circuit, an alternative circuit that can operate as a substitute to replace the arithmetic processor, and a mode switch to switch a control mode between a first control mode, in which the arithmetic processor controls the motor drive circuit, and a second control mode, in which the alternative circuit controls the motor drive circuit, based on a state of the arithmetic processor. The mode switch switches the control mode from the first control mode to the second control mode when a state of the arithmetic processor changes from a normal state to an abnormal state.

19 Claims, 4 Drawing Sheets

MOTOR CONTROL DEVICE, MOTOR UNIT, AND VEHICLE

CROSS-REFERENCE TO RELATED APPLICATIONS

The present application claims priority under 35 U.S.C. § 119 to Japanese Patent Application No. 2020-154505, filed on Sep. 15, 2020, the entire contents of which are hereby incorporated herein by reference.

1. FIELD OF THE INVENTION

The present disclosure relates to a motor control device, a motor assembly, and a vehicle.

2. BACKGROUND

As a technique for protecting an inverter and a motor at the time of abnormality of the inverter that drives the motor, active short-circuit control (ASC control) for controlling all switching elements included in an upper arm or a lower arm of the inverter to be in an on state, and shutdown control (SD control) for controlling all switching elements of the inverter to be in an off state are known. Hereinafter, the ASC control and the SD control are collectively referred to as fail-safe control.

For example, there is known a technique of changing an overcurrent threshold from a normal-time threshold to a short-circuit control threshold larger than the normal-time threshold at the time of executing the ASC control in order to prevent the ASC control from being canceled due to output current of an inverter instantaneously exceeding the overcurrent threshold at the time of executing the ASC control.

Further, for example, there is known a technique in which, in order to prevent excessive surge voltage from being applied to a switching element at the time the SD control is executed, all switching elements included in an upper arm are controlled to be in an off state at the time the SD control is executed, and all switching elements included in a lower arm are controlled to be in an off state after a predetermined time elapses.

A motor control device includes an arithmetic processing device such as a micro controller unit (MCU) or a central processing unit (CPU) that controls switching elements of an inverter. Generally, the fail-safe control including the ASC control and the SD control is executed by the arithmetic processing device. For this reason, when an abnormality occurs in the arithmetic processing device, there is a possibility that the fail-safe control is not executed.

SUMMARY

A motor control device according to an example embodiment of the present disclosure includes a motor drive circuit including an upper arm and a lower arm, an arithmetic processor to control the motor drive circuit, an alternative circuit that can operate as a substitute to replace the arithmetic processor, and a mode switch to switch a control mode between a first control mode, in which the arithmetic processor controls the motor drive circuit, and a second control mode, in which the alternative circuit controls the motor drive circuit, based on a state of the arithmetic processor. The mode switch switches the control mode from the first control mode to the second control mode when a state of the arithmetic processor changes from a normal state to an abnormal state. In the second control mode, the alternative circuit controls switching of switches included in the upper arm and the lower arm based on a state of the upper arm and the lower arm.

A motor control device according to an example embodiment of the present disclosure includes a motor drive circuit including an upper arm and a lower arm, an arithmetic processor to control the motor drive circuit, an alternative circuit that can operate as a substitute to replace the arithmetic processor, a first overvoltage detection circuit to output a first overvoltage detection signal whose state changes depending on a magnitude of an input voltage of the motor drive circuit, and a mode switch to switch a control mode between a first control mode, in which the arithmetic processor controls the motor drive circuit, and a second control mode, in which the alternative circuit controls the motor drive circuit, based on a state of the first overvoltage detection signal. The arithmetic processor compares an input voltage of the motor drive circuit with a first threshold, and executes fail-safe control when the input voltage exceeds the first threshold. The first overvoltage detection circuit compares an input voltage of the motor drive circuit with a second threshold higher than the first threshold, and changes a state of the first overvoltage detection signal from a first state to a second state when the input voltage exceeds the second threshold. The mode switch switches the control mode from the first control mode to the second control mode when a state of the first overvoltage detection signal changes from the first state to the second state. In the second control mode, the alternative circuit controls switching of switches included in the upper arm and the lower arm based on a state of the upper arm and the lower arm.

A motor according to an example embodiment of the present disclosure includes a motor and the motor control device of the above example embodiment that controls the motor.

A vehicle according to an example embodiment of the present disclosure includes the motor assembly of the above example embodiment.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the accompanying drawings.

Figure 1:
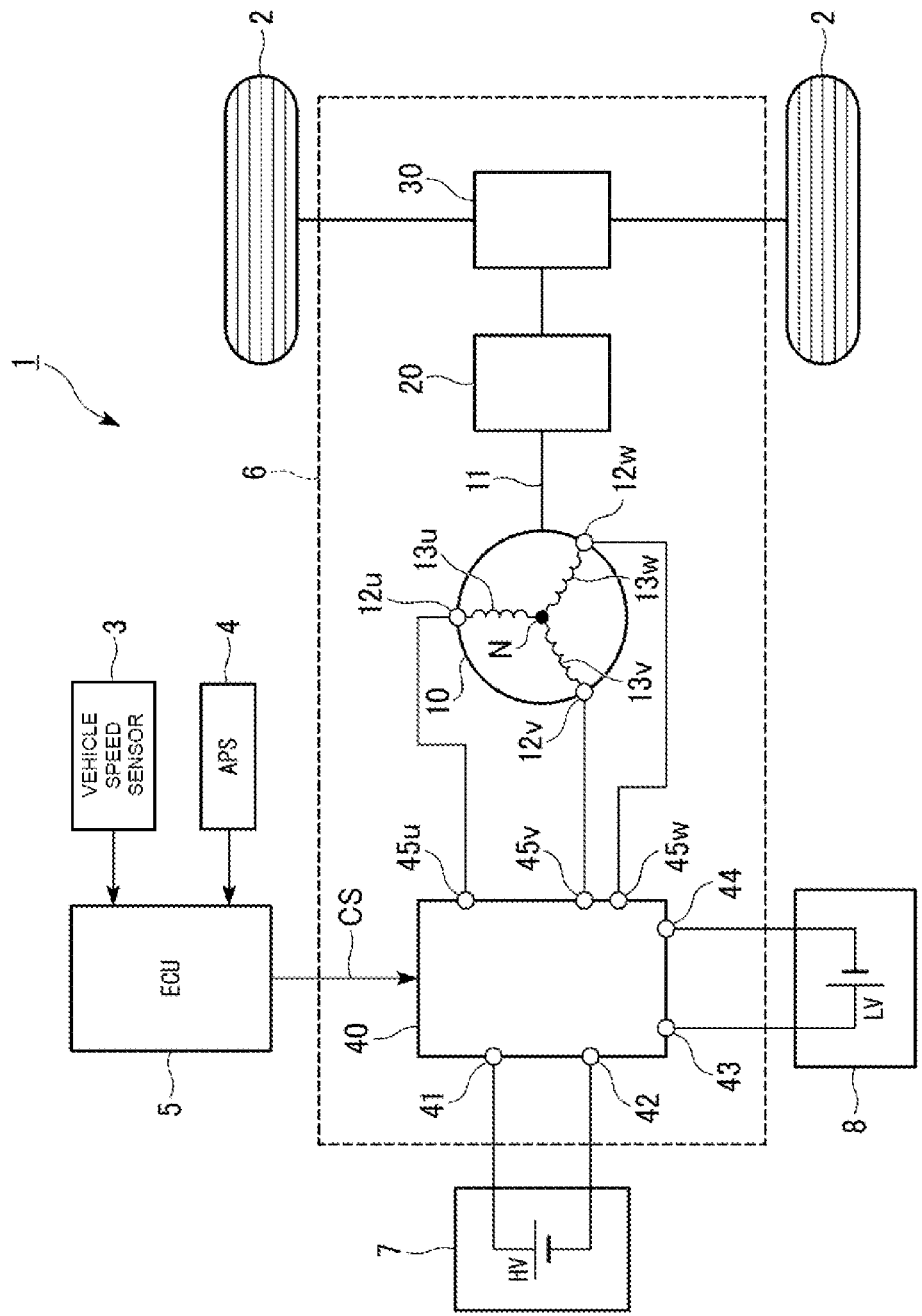
FIG. 1 is a diagram schematically illustrating a configuration of a vehicle according to an example embodiment of the present disclosure.

FIG. 1 is a diagram schematically illustrating a configuration of a vehicle 1 according to the present example embodiment. For example, the vehicle 1 is an electric car that travels on four wheels including two driving wheels 2 and two steering wheels (not illustrated). The vehicle 1 in the present example embodiment includes a vehicle speed sensor 3, an accelerator position sensor (APS) 4, an electronic control unit (ECU) 5, a motor assembly 6, a high-voltage battery 7, and a low-voltage battery 8.

The vehicle speed sensor 3 detects the speed of the vehicle 1 and outputs a result of the detection to the electronic control device 5 as vehicle speed data. The accelerator position sensor 4 detects a depression amount of an accelerator pedal, and outputs a result of the detection to the electronic control device 5 as accelerator position data.

The electronic control unit 5 controls a driving force transmitted to the driving wheels 2 by the motor assembly 6 described later based on the vehicle speed data input from the vehicle speed sensor 3 and the accelerator position data input from the accelerator position sensor 4. Specifically, the electronic control unit 5 determines, based on the vehicle speed data and the accelerator position data, a torque command value Tm* at which a driving force requested by the driver is transmitted to the driving wheel 2, and outputs a motor control signal CS indicating the torque command value Tm* to the motor assembly 6.

The motor assembly 6 drives the driving wheel 2 based on the motor control signal CS input from the electronic control unit 5. Specifically, the motor assembly 6 transmits the driving force requested by the driver to the driving wheel 2 by controlling the torque of a motor 10 based on the torque command value Tm* indicated by the motor control signal CS. The motor assembly 6 includes the motor 10, a reduction gear 20, a differential gear 30, and a motor control device 40.

The motor 10 is a high-output motor used as a drive source of the vehicle 1. For example, the motor 10 is an inner rotor type three-phase synchronous motor. The motor 10 includes a rotor shaft 11, a U-phase terminal 12u, a V-phase terminal 12v, a W-phase terminal 12w, a U-phase coil 13u, a V-phase coil 13v, and a W-phase coil 13w.

Further, although not illustrated in FIG. 1, the motor 10 includes a motor housing, and a rotor and a stator housed in the motor housing. The rotor is a rotating body rotatably supported by a bearing component inside the motor housing. The stator is fixed inside the motor housing in a state of surrounding an outer peripheral surface of the rotor, and generates an electromagnetic force necessary for rotating the rotor.

The rotor shaft 11 is a shaft body coaxially joined to the rotor. The U-phase terminal 12u, the V-phase terminal 12v, and the W-phase terminal 12w are metal terminals exposed from a surface of the motor housing. The U-phase terminal 12u, the V-phase terminal 12v, and the W-phase terminal 12w are electrically connected to the motor control device 40. The U-phase coil 13u, the V-phase coil 13v, and the W-phase coil 13w are excitation coils provided in the stator. The U-phase coil 13u, the V-phase coil 13v, and the W-phase coil 13w are star-connected inside the motor 10.

The U-phase coil 13u is electrically connected between the U-phase terminal 12u and a neutral point N. The V-phase coil 13v is electrically connected between the V-phase terminal 12v and the neutral point N. The W-phase coil 13w is electrically connected between the W-phase terminal 12w and the neutral point N. Three-phase current flowing through the U-phase coil 13u, the V-phase coil 13v, and the W-phase coil 13w is controlled by the motor control device 40, so that an electromagnetic force necessary for rotating the rotor is generated. When the rotor rotates, the rotor shaft 11 also rotates in synchronization with the rotor. A rotational force of the rotor shaft 11 is transmitted to the driving wheel 2 via a power transmission mechanism including the reduction gear 20 and the differential gear 30.

The motor control device 40 controls the motor 10 based on the motor control signal CS input from the electronic control device 5. Specifically, the motor control device 40 controls the three-phase current flowing through the U-phase coil 13u, the V-phase coil 13v, and the W-phase coil 13w based on the torque command value Tm* indicated by the motor control signal CS, so as to control the torque of the motor 10 to a value corresponding to the torque command value Tm*.

The motor control device 40 includes a high-voltage positive electrode terminal 41, a high-voltage negative electrode terminal 42, a low-voltage positive electrode terminal 43, and a low-voltage negative electrode terminal 44 as power supply terminals. The high-voltage positive electrode terminal 41 is electrically connected to a positive electrode terminal of the high-voltage battery 7. The high-voltage negative electrode terminal 42 is electrically connected to a negative electrode terminal of the high-voltage battery 7. The low-voltage positive electrode terminal 43 is electrically connected to a positive electrode terminal of the low-voltage battery 8. The low-voltage negative electrode terminal 44 is electrically connected to a negative electrode terminal of the low-voltage battery 8.

The high-voltage battery 7 and the low-voltage battery are, for example, secondary batteries such as a lithium ion battery or a nickel hydrogen battery. The high-voltage battery 7 outputs, for example, a high-DC voltage HV of 470 V. The low-voltage battery 8 outputs, for example, a low-DC voltage LV of 12 V. Although details will be described later, an internal circuit of the motor control device 40 is divided into a high-voltage system circuit and a low-voltage system circuit. The high-DC voltage HV output from the high-voltage battery 7 to the motor control device 40 is used as power supply voltage for operating the high-voltage system circuit, and the low-DC voltage LV output from the low-voltage battery 8 to the motor control device 40 is used as power supply voltage for operating the low-voltage system circuit.

The motor control device 40 includes a U-phase output terminal 45u, a V-phase output terminal 45v, and a W-phase output terminal 45w as output terminals. The U-phase output terminal 45u is electrically connected to the U-phase terminal 12u of the motor 10. The V-phase output terminal 45v is electrically connected to the V-phase terminal 12v of the motor 10. The W-phase output terminal 45w is electrically connected to the W-phase terminal 12w of the motor 10. When the three-phase current is supplied from the motor control device 40 to the motor 10 via the U-phase output terminal 45u, the V-phase output terminal 45v, and the W-phase output terminal 45w, the motor 10 rotates with the torque determined by the torque command value Tm*.

Figure 2:
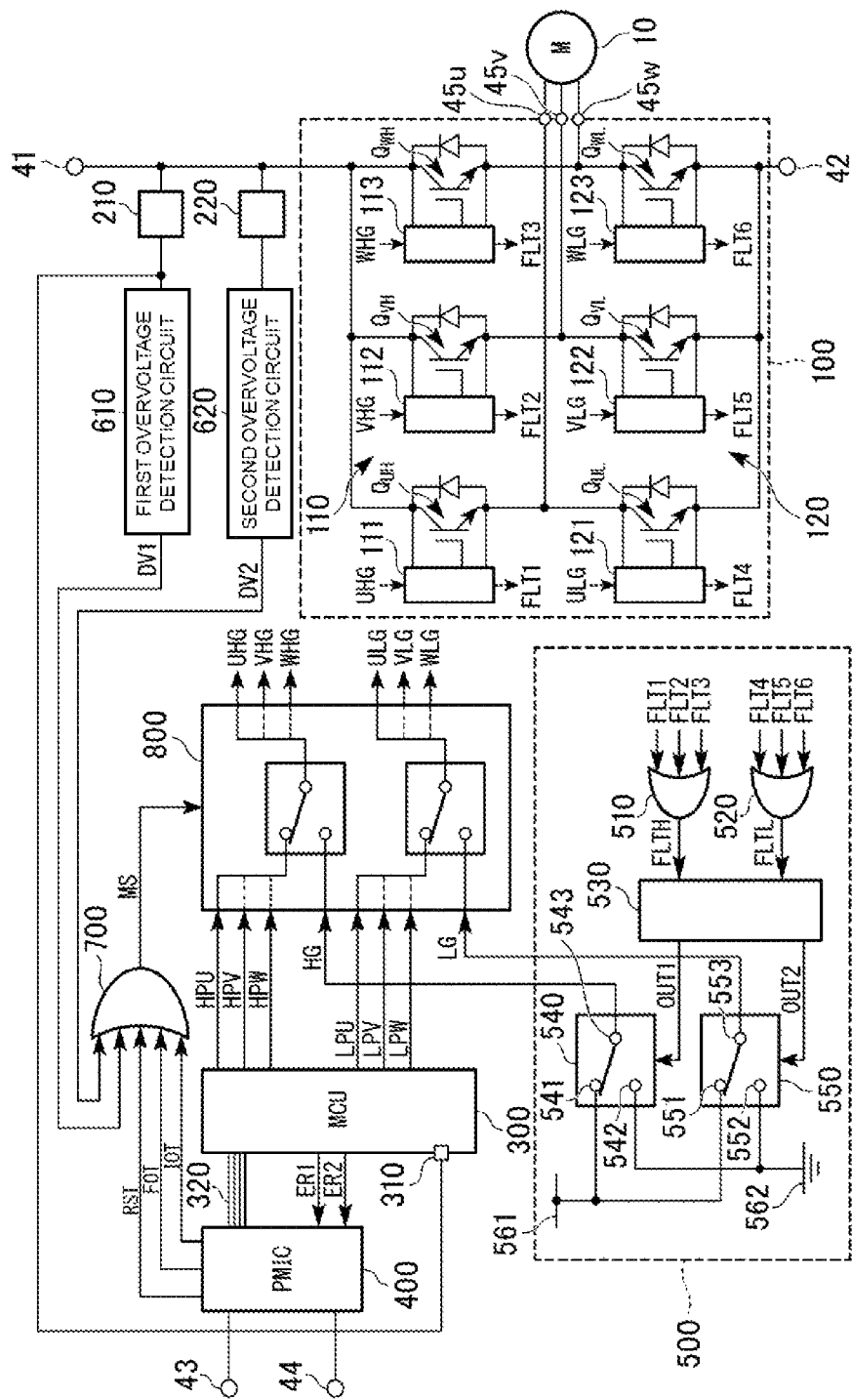
FIG. 2 is a diagram schematically illustrating a configuration of an internal circuit of a motor control device according to an example embodiment of the present disclosure.

FIG. 2 is a diagram schematically illustrating a configuration of the internal circuit of the motor control device 40. As illustrated in FIG. 2, the motor control device 40 includes a motor drive circuit 100, a first separation circuit 210, a second separation circuit 220, an MCU 300, a power management integrated circuit (PMIC) 400, an alternative circuit 500, a first overvoltage detection circuit 610, a second overvoltage detection circuit 620, an OR circuit 700, and a multiplexer 800.

The motor drive circuit 100 is a three-phase inverter that converts DC power supplied from the high-voltage battery 7 into three-phase power and outputs the three-phase power to the motor 10. The motor drive circuit 100 has an upper arm 110 including three upper switching elements and a lower arm 120 including three lower switching elements. The upper arm 110 includes a U-phase upper switching element $Q_{UH}$, a V-phase upper switching element $Q_{VH}$, and a W-phase upper switching element $Q_{WH}$. The lower arm 120 includes a U-phase lower switching element $Q_{UL}$, a V-phase lower switching element $Q_{VL}$, and a W-phase lower switching element $Q_{WL}$. In the present example embodiment, each of the switching elements is, for example, an N-channel IGBT. Further, each of the switching elements includes freewheel diodes in antiparallel.

The collector terminal of the U-phase upper switching element $Q_{UH}$, the collector terminal of the V-phase upper switching element $Q_{VH}$, and the collector terminal of the W-phase upper switching element $Q_{WH}$ are electrically connected to the high-voltage positive electrode terminal 41. The emitter terminal of the U-phase lower switching element $Q_{UL}$, the emitter terminal of the V-phase lower switching element $Q_{VL}$, and the emitter terminal of the W-phase lower switching element $Q_{WL}$ are electrically connected to the high-voltage negative electrode terminal 42. Note that, as described above, the high-voltage positive electrode terminal 41 is electrically connected to the positive electrode terminal of the high-voltage battery 7, and the high-voltage negative electrode terminal 42 is electrically connected to the negative electrode terminal of the high-voltage battery 7.

The emitter terminal of the U-phase upper switching element $Q_{UH}$ is electrically connected to each of the U-phase output terminal 45u and a collector terminal of the U-phase lower switching element $Q_{UL}$. That is, the emitter terminal of the U-phase upper switching element $Q_{UH}$ is electrically connected to the U-phase terminal 12u of the motor 10 via the U-phase output terminal 45u.

The emitter terminal of the V-phase upper switching element $Q_{VH}$ is electrically connected to each of the V-phase output terminal 45v and a collector terminal of the V-phase lower switching element $Q_{VL}$. That is, the emitter terminal of the V-phase upper switching element $Q_{VH}$ is electrically connected to the V-phase terminal 12v of the motor 10 via the V-phase output terminal 45v.

The emitter terminal of the W-phase upper switching element $Q_{WH}$ is electrically connected to each of the W-phase output terminal 45w and a collector terminal of the W-phase lower switching element $Q_{WL}$. That is, the emitter terminal of the W-phase upper switching element $Q_{WH}$ is electrically connected to the W-phase terminal 12w of the motor 10 via the W-phase output terminal 45w.

The motor drive circuit 100 includes a U-phase upper gate driver 111, a V-phase upper gate driver 112, a W-phase upper gate driver 113, a U-phase lower gate driver 121, a V-phase lower gate driver 122, and a W-phase lower gate driver 123 as gate drivers for driving the switching elements.

The U-phase upper gate driver 111 is electrically connected to the gate terminal, the collector terminal, and the emitter terminal of the U-phase upper switching element $Q_{UH}$. The U-phase upper gate driver 111 changes gate voltage of the U-phase upper switching element $Q_{UH}$ based on a U-phase upper gate control signal UHG output from the multiplexer 800. The gate voltage is voltage between the gate terminal and the emitter terminal. Specifically, for example, when the U-phase upper gate control signal UHG is at a high level, the U-phase upper gate driver 111 changes the gate voltage to a value at which the U-phase upper switching element $Q_{UH}$ is in an on state. In contrast, when the U-phase upper gate control signal UHG is at a low level, the U-phase upper gate driver 111 changes the gate voltage to a value at which the U-phase upper switching element $Q_{UH}$ is in an off state.

Further, the U-phase upper gate driver 111 outputs a fault signal FLT1 which is an abnormality detection signal to the MCU 300 and the alternative circuit 500. The U-phase upper gate driver 111 outputs the fault signal FLT1 at a high level when the U-phase upper switching element $Q_{UH}$ is in a normal state. In contrast, the U-phase upper gate driver 111 outputs the fault signal FLT1 at a low level when the U-phase upper switching element $Q_{UH}$ is in an abnormal state. For example, when excessive collector current flows through the U-phase upper switching element $Q_{UH}$, the collector-emitter voltage exceeds a saturation voltage. In this case, the U-phase upper switching element $Q_{UH}$ is determined to be in an abnormal state. For example, the U-phase upper gate driver 111 monitors the collector-emitter voltage of the U-phase upper switching element $Q_{UH}$, and outputs the fault signal FLT1 at a low level when the collector-emitter voltage exceeds a saturation voltage.

Note that an event in which the U-phase upper switching element $Q_{UH}$ is determined to be in an abnormal state is not limited to the event in which excessive collector current flows through the U-phase upper switching element $Q_{UH}$. For example, an event in which a temperature of the U-phase upper switching element $Q_{UH}$ greatly increases is also an event in which the U-phase upper switching element $Q_{UH}$ is determined to be in an abnormal state. For this reason, for example, the U-phase upper gate driver 111 may monitor a temperature of the U-phase upper switching element $Q_{UH}$ with a thermistor or the like, and output the fault signal FLT1 at a low level when the temperature exceeds a threshold. Further, the U-phase upper gate driver 111 may output the fault signal FLT1 at a low level even in a case where the U-phase upper gate driver 111 does not operate due to, for example, no input of power supply voltage of the U-phase upper gate driver 111.

The V-phase upper gate driver 112 is electrically connected to the gate terminal, the collector terminal, and the emitter terminal of the V-phase upper switching element $Q_{VH}$. Similarly to the U-phase upper gate driver 111, the V-phase upper gate driver 112 changes the gate voltage of the V-phase upper switching element $Q_{VH}$ based on a V-phase upper gate control signal VHG output from the multiplexer 800.

Further, similarly to the U-phase upper gate driver 111, the V-phase upper gate driver 112 outputs a fault signal FLT2 which is an abnormality detection signal to the MCU 300 and the alternative circuit 500. That is, the V-phase upper gate driver 112 outputs the fault signal FLT2 at a high level when the V-phase upper switching element $Q_{VH}$ is in a normal state. In contrast, the V-phase upper gate driver 112 outputs the fault signal FLT2 at a low level when the V-phase upper switching element $Q_{VH}$ is in an abnormal state.

The W-phase upper gate driver 113 is electrically connected to the gate terminal, the collector terminal, and the emitter terminal of the W-phase upper switching element $Q_{WH}$. Similarly to the U-phase upper gate driver 111, the W-phase upper gate driver 113 changes the gate voltage of the W-phase upper switching element $Q_{WH}$ based on a W-phase upper gate control signal WHG output from the multiplexer 800.

Further, similarly to the U-phase upper gate driver 111, the W-phase upper gate driver 113 outputs a fault signal FLT3 which is an abnormality detection signal to the MCU 300 and the alternative circuit 500. That is, the W-phase upper gate driver 113 outputs the fault signal FLT3 at a high level when the W-phase upper switching element $Q_{WH}$ is in a normal state. In contrast, the W-phase upper gate driver 113 outputs the fault signal FLT3 at a low level when the W-phase upper switching element $Q_{WH}$ is in an abnormal state.

The U-phase lower gate driver 121 is electrically connected to the gate terminal, the collector terminal, and the emitter terminal of the U-phase lower switching element $Q_{UL}$. Similarly to the U-phase upper gate driver 111, the U-phase lower gate driver 121 changes the gate voltage of the U-phase lower switching element $Q_{UL}$ based on a U-phase lower gate control signal ULG output from the multiplexer 800.

Further, similarly to the U-phase upper gate driver 111, the U-phase lower gate driver 121 outputs a fault signal FLT4 which is an abnormality detection signal to the MCU 300 and the alternative circuit 500. That is, the U-phase lower gate driver 121 outputs the fault signal FLT4 at a high level when the U-phase lower switching element $Q_{UL}$ is in a normal state. In contrast, the U-phase lower gate driver 121 outputs the fault signal FLT4 at a low level when the U-phase lower switching element $Q_{UL}$ is in an abnormal state.

The V-phase lower gate driver 122 is electrically connected to the gate terminal, the collector terminal, and the emitter terminal of the V-phase lower switching element $Q_{VL}$. Similarly to the U-phase upper gate driver 111, the V-phase lower gate driver 122 changes the gate voltage of the V-phase lower switching element $Q_{VL}$ based on a V-phase lower gate control signal VLG output from the multiplexer 800.

Further, similarly to the U-phase upper gate driver 111, the V-phase lower gate driver 122 outputs a fault signal FLT5 which is an abnormality detection signal to the MCU 300 and the alternative circuit 500. That is, the V-phase lower gate driver 122 outputs the fault signal FLT5 at a high level when the V-phase lower switching element $Q_{VL}$ is in a normal state. In contrast, the V-phase lower gate driver 122 outputs the fault signal FLT5 at a low level when the V-phase lower switching element $Q_{VL}$ is in an abnormal state.

The W-phase lower gate driver 123 is electrically connected to the gate terminal, the collector terminal, and the emitter terminal of the W-phase lower switching element $Q_{WL}$. Similarly to the U-phase upper gate driver 111, the W-phase lower gate driver 123 changes the gate voltage of the W-phase lower switching element $Q_{WL}$ based on a W-phase lower gate control signal WLG output from the multiplexer 800.

Further, similarly to the U-phase upper gate driver 111, the W-phase lower gate driver 123 outputs a fault signal FLT6 which is an abnormality detection signal to the MCU 300 and the alternative circuit 500. That is, the W-phase lower gate driver 123 outputs the fault signal FLT6 at a high level when the W-phase lower switching element $Q_{WL}$ is in a normal state. In contrast, the W-phase lower gate driver 123 outputs the fault signal FLT6 at a low level when the W-phase lower switching element $Q_{WL}$ is in an abnormal state.

The first separation circuit 210 and the second separation circuit 220 are circuits that separate the internal circuit of the motor control device 40 into the high-voltage system circuit and the low-voltage system circuit. The high-voltage system circuit includes the motor drive circuit 100 described above. The low-voltage system circuit includes the MCU 300, the PMIC 400, the alternative circuit 500, the first overvoltage detection circuit 610, the second overvoltage detection circuit 620, the OR circuit 700, and the multiplexer 800.

An input terminal of the first separation circuit 210 is electrically connected to the high-voltage positive electrode terminal 41. An output terminal of the first separation circuit 210 is electrically connected to an input terminal of the first overvoltage detection circuit 610 and an overvoltage detection port 310 of the MCU 300. The first separation circuit 210 electrically separates the high-voltage system circuit and the low-voltage system circuit from each other, and converts the high-DC voltage HV input from the high-voltage battery 7 into a low voltage that can be input to the first overvoltage detection circuit 610 to output the voltage.

An input terminal of the second separation circuit 220 is electrically connected to the high-voltage positive electrode terminal 41. An output terminal of the second separation circuit 220 is electrically connected to an input terminal of the second overvoltage detection circuit 620. The second separation circuit 220 electrically separates the high-voltage system circuit and the low-voltage system circuit from each other, and converts the high-DC voltage HV input from the high-voltage battery 7 into a low voltage that can be input to the second overvoltage detection circuit 620 to output the voltage. The first separation circuit 210 and the second separation circuit 220 include a circuit including, for example, an isolator and a resistance voltage dividing circuit.

An output voltage of the first separation circuit 210 is equal to an output voltage of the second separation circuit 220. The output voltages of the first separation circuit 210 and the second separation circuit 220 are proportional to the high-DC voltage HV input from the high voltage battery 7, that is, an input voltage of the motor drive circuit 100. In other words, the output voltages of the first separation circuit 210 and the second separation circuit 220 represent the input voltage of the motor drive circuit 100. For this reason, hereinafter, the output voltages of the first separation circuit 210 and the second separation circuit 220 are referred to as an inverter input voltage $V_{INV}$.

The MCU 300 is an arithmetic processing device that controls the motor drive circuit 100. The MCU 300 is, for example, a dual-core type MCU equipped with two processor cores. In addition to the two processor cores, the MCU 300 includes a physical non-transitory memory such as a flash memory that stores a program and the like executed by the processor core, a volatile memory such as a random access memory (RAM), an input/output port, a communication port, an internal bus that interconnects these, and the like.

The MCU 300 includes, as a communication port, a controller area network (CAN) communication port for performing CAN communication with the electronic control unit 5, and a serial peripheral interface (SPI) communication port for performing SPI communication with the PMIC 400. The CAN communication port of the MCU 300 is electrically connected to the electronic control unit 5 via a CAN communication cable (not illustrated). The motor control signal CS output from the electronic control unit 5 is input to the MCU 300 via the CAN communication cable and the CAN communication port. The SPI communication port of the MCU 300 is electrically connected to the PMIC 400 via an SPI communication bus 320 of a four-wire type.

The MCU 300 performs switching control of each switching element included in the motor drive circuit 100 on the basis of the motor control signal CS input from the electronic control unit 5. Specifically, the MCU 300 generates a timing signal indicating a switching timing of each switching element based on the torque command value Tm* indicated by the motor control signal CS, and outputs the timing signal from an output port to the multiplexer 800. The switching timing is a timing at which the state of each switching element is switched from an off state to an on state and a timing at which the state is switched from the on state to the off state. The timing signal is, for example, a pulse-width modulated rectangular wave signal.

Specifically, the MCU 300 outputs a U-phase upper timing signal HPU representing a switching timing of the U-phase upper switching element $Q_{UH}$ to the multiplexer 800, and outputs a U-phase lower timing signal LPU representing a switching timing of the U-phase lower switching element $Q_{UL}$ to the multiplexer 800.

Further, the MCU 300 outputs a V-phase upper timing signal HPV representing a switching timing of the V-phase upper switching element $Q_{VH}$ to the multiplexer 800, and outputs a V-phase lower timing signal LPV representing a switching timing of the V-phase lower switching element $Q_{VL}$ to the multiplexer 800.

Further, the MCU 300 outputs a W-phase upper timing signal HSW representing a switching timing of the W-phase upper switching element $Q_{WH}$ to the multiplexer 800, and outputs a W-phase lower timing signal LPW representing a switching timing of the W-phase lower switching element $Q_{WL}$ to the multiplexer 800.

The MCU 300 includes, as an input port, the overvoltage detection port 310 electrically connected to an output terminal of the first separation circuit 210. Although details will be described later, the MCU 300 compares the inverter input voltage $V_{INV}$ input from the first separation circuit 210 via the overvoltage detection port 310 with a first threshold $V_{TH1}$, and executes the fail-safe control when the inverter input voltage $V_{INV}$ exceeds the first threshold $V_{TH1}$. The fail-safe control means control in which all the switching elements included in one of the upper arm 110 and the lower arm 120 are set to be in an on state and all the switching elements included in the other are set to be in an off state (ASC control), or control in which all the switching elements included in both the upper arm 110 and the lower arm 120 are set to be in an off state (SD control). Note that the first threshold $V_{TH1}$ is digital data stored in advance in a physical non-transitory memory of the MCU 300. Further, the inverter input voltage $V_{INV}$ input via the overvoltage detection port 310 is converted into digital data by an AD converter incorporated in the MCU 300.

The MCU 300 outputs a first error signal ER1 and a second error signal ER2 to the PMIC 400 as signals for notifying abnormality of the two processor cores. Specifically, when the two processor cores are in a normal state, the MCU 300 sets both the first error signal ER1 and the second error signal ER2 to a high level. In contrast, when at least one of the two processor cores is in an abnormal state, the MCU 300 sets at least one of the first error signal ER1 and the second error signal ER2 to a low level.

The PMIC 400 performs power management of the MCU 300 and functions as a monitor that monitors the state of the MCU 300. The PMIC 400 is provided separately from the MCU 300. The PMIC 400 is communicably connected to the MCU 300 via the SPI communication bus 320. The PMIC 400 communicates with the MCU 300 via the SPI communication bus 320 in order to perform processing necessary for power management of the MCU 300.

The PMIC 400 is electrically connected to the low-voltage battery 8 via the low-voltage positive electrode terminal 43 and the low-voltage negative electrode terminal 44. The PMIC 400 generates power supply voltage necessary for operation of the low-voltage system circuit based on the low-DC voltage LV output from the low-voltage battery 8, and supplies the generated power supply voltage to the MCU 300, the alternative circuit 500, the first overvoltage detection circuit 610, the second overvoltage detection circuit 620, the OR circuit 700, the multiplexer 800, and the like.

The PMIC 400 outputs a restart signal RST, a first abnormality detection signal FOT, and a second abnormality detection signal IOT to the OR circuit 700 as signals for notifying abnormality of the MCU 300. Specifically, when the MCU 300 is in a normal state, the PMIC 400 sets all of the restart signal RST, the first abnormality detection signal FOT, and the second abnormality detection signal IOT to a high level.

When the MCU 300 is in an abnormal state, the PMIC 400 sets at least one of the restart signal RST, the first abnormality detection signal FOT, and the second abnormality detection signal IOT to a low level. For example, when at least one of the first error signal ER1 and the second error signal ER2 input from the MCU 300 is at a low level, the PMIC 400 sets the first abnormality detection signal FOT to a low level. Further, when an abnormality that requires restart of the MCU 300 occurs, the PMIC 400 sets the restart signal RST to a low level. Further, when another abnormality occurs in the MCU 300, the PMIC 400 sets the second abnormality detection signal IOT to a low level.

The alternative circuit 500 is a circuit that substitutes for the MCU 300. The alternative circuit 500 includes a first OR circuit 510, a second OR circuit 520, a matrix circuit 530, a first switch 540, and a second switch 550.

The first OR circuit 510 receives input of the fault signal FLT1 output from the U-phase upper gate driver 111, the fault signal FLT2 output from the V-phase upper gate driver 112, and the fault signal FLT3 output from the W-phase upper gate driver 113. The first OR circuit 510 calculates the OR of the fault signals FLT1, FLT2, and FLT3, and outputs an upper arm fault signal FLTH indicating a result of the calculation to the matrix circuit 530.

The first OR circuit 510 is an OR circuit of the negative logic. Therefore, when at least one of the fault signals FLT1, FLT2, and FLT3 is at a low level, the upper arm fault signal FLTH at a low level is output from the first OR circuit 510. When all of the fault signals FLT1, FLT2, and FLT3 are at a high level, the upper arm fault signal FLTH at a high level is output from the first OR circuit 510. In other words, when at least one of the U-phase upper switching element $Q_{UH}$, the V-phase upper switching element $Q_{VH}$, and the W-phase upper switching element $Q_{WH}$ included in the upper arm 110 is in an abnormal state, the upper arm fault signal FLTH at a low level is output from the first OR circuit 510. When all of the U-phase upper switching element $Q_{UH}$, the V-phase upper switching element $Q_{VH}$, and the W-phase upper switching element $Q_{WH}$ included in the upper arm 110 are in a normal state, the upper arm fault signal FLTH at a high level is output from the first OR circuit 510.

Hereinafter, that at least one of the U-phase upper switching element $Q_{UH}$, the V-phase upper switching element $Q_{VH}$, and the W-phase upper switching element $Q_{WH}$ included in the upper arm 110 is in an abnormal state will be described as "the upper arm 110 is in an abnormal state". Further, that all of the U-phase upper switching element $Q_{UH}$, the V-phase upper switching element $Q_{VH}$, and the W-phase upper switching element $Q_{WH}$ included in the upper arm 110 are in a normal state will be described as "the upper arm 110 is in a normal state". That is, when the upper arm 110 is in an abnormal state, the upper arm fault signal FLTH at a low level is output from the first OR circuit 510. Further, when the upper arm 110 is in a normal state, the upper arm fault signal FLTH at a high level is output from the first OR circuit 510.

The second OR circuit 520 receives input of the fault signal FLT4 output from the U-phase lower gate driver 121, the fault signal FLT5 output from the V-phase lower gate driver 122, and the fault signal FLT6 output from the W-phase lower gate driver 123. The second OR circuit 520 calculates the OR of the fault signals FLT4, FLT5, and FLT6, and outputs a lower arm fault signal FLTL indicating a result of the calculation to the matrix circuit 530.

The second OR circuit 520 is an OR circuit of the negative logic. Therefore, when at least one of the fault signals FLT4, FLT5, and FLT6 is at a low level, the lower arm fault signal FLTL at a low level is output from the second OR circuit 520. When all of the fault signals FLT4, FLT5, and FLT6 are at a high level, the lower arm fault signal FLTL at a high level is output from the second OR circuit 520. In other words, when at least one of the U-phase lower switching element $Q_{UL}$, the V-phase lower switching element $Q_{VL}$, and the W-phase lower switching element $Q_{WL}$ included in the lower arm 120 is in an abnormal state, the lower arm fault signal FLTL at a low level is output from the second OR circuit 520. When all of the U-phase lower switching element $Q_{UL}$, the V-phase lower switching element $Q_{VL}$, and the W-phase lower switching element $Q_{WL}$ included in the lower arm 120 are in a normal state, the lower arm fault signal FLTL at a high level is output from the second OR circuit 520.

Hereinafter, that at least one of the U-phase lower switching element $Q_{UL}$, the V-phase lower switching element $Q_{VL}$, and the W-phase lower switching element $Q_{WL}$ included in the lower arm 120 is in an abnormal state will be described as "the lower arm 120 is in an abnormal state". Further, that all of the U-phase lower switching element $Q_{UL}$, the V-phase lower switching element $Q_{VL}$, and the W-phase lower switching element $Q_{WL}$ included in the lower arm 120 are in a normal state is described as "the lower arm 120 is in a normal state". That is, when the lower arm 120 is in an abnormal state, the lower arm fault signal FLTL at a low level is output from the second OR circuit 520. Further, when the lower arm 120 is in a normal state, the lower arm fault signal FLTL at a high level is output from the second OR circuit 520.

The matrix circuit 530 outputs a first output signal OUT1 to the first switch 540 and outputs a second output signal OUT2 to the second switch 550 based on the upper arm fault signal FLTH input from the first OR circuit 510 and the lower arm fault signal FLTL input from the second OR circuit 520.

When both the upper arm fault signal FLTH and the lower arm fault signal FLTL are at a high level, the matrix circuit 530 outputs the first output signal OUT1 at a low level to the first switch 540 and outputs the second output signal OUT2 at a high level to the second switch 550. In other words, when both the upper arm 110 and the lower arm 120 are in a normal state, the matrix circuit 530 outputs the first output signal OUT1 at a low level to the first switch 540 and outputs the second output signal OUT2 at a high level to the second switch 550.

When the upper arm fault signal FLTH is at a low level and the lower arm fault signal FLTL is at a high level, the matrix circuit 530 outputs the first output signal OUT1 at a low level to the first switch 540 and outputs the second output signal OUT2 at a high level to the second switch 550. In other words, when the upper arm 110 between the upper arm 110 and the lower arm 120 is in an abnormal state, the matrix circuit 530 outputs the first output signal OUT1 at a low level to the first switch 540 and outputs the second output signal OUT2 at a high level to the second switch 550.

When the upper arm fault signal FLTH is at a high level and the lower arm fault signal FLTL is at a low level, the matrix circuit 530 outputs the first output signal OUT1 at a high level to the first switch 540 and outputs the second output signal OUT2 at a low level to the second switch 550. In other words, when the lower arm 120 between the upper arm 110 and the lower arm 120 is in an abnormal state, the matrix circuit 530 outputs the first output signal OUT1 at a high level to the first switch 540 and outputs the second output signal OUT2 at a low level to the second switch 550.

When both the upper arm fault signal FLTH and the lower arm fault signal FLTL are at a low level, the matrix circuit 530 outputs the first output signal OUT1 at a low level to the first switch 540 and outputs the second output signal OUT2 at a low level to the second switch 550. In other words, when both the upper arm 110 and the lower arm 120 are in an abnormal state, the matrix circuit 530 outputs the first output signal OUT1 at a low level to the first switch 540 and outputs the second output signal OUT2 at a low level to the second switch 550.

The first switch 540 has three contacts 541, 542, and 543. The contact 541 is electrically connected to a high-level voltage line 561. High-level voltage VHi is supplied from the PMIC 400 to the high-level voltage line 561. The contact 542 is electrically connected to a low-level voltage line 562. Low-level voltage VLo is supplied from the PMIC 400 to the low-level voltage line 562. In other words, the low-level voltage line 562 is electrically connected to the low-voltage negative electrode terminal 44, which is a ground terminal of the low-voltage system circuit.

The contact 543 is electrically connected to the multiplexer 800. Hereinafter, a signal output from the contact 543 to the multiplexer 800 is referred to as an upper arm control signal HG. When the first output signal OUT1 input from the matrix circuit 530 to the first switch 540 is at a low level, the contact 542 and the contact 543 are electrically connected, so that the upper arm control signal HG having the low-level voltage VLo is output from the contact 543 to the multiplexer 800. Further, when the first output signal OUT1 input from the matrix circuit 530 to the first switch 540 is at a high level, the contact 541 and the contact 543 are electrically connected, so that the upper arm control signal HG having the high-level voltage VHi is output from the contact 543 to the multiplexer 800.

The second switch 550 has three contacts 551, 552, and 553. The contact 551 is electrically connected to the high-level voltage line 561. The contact 552 is electrically connected to the low-level voltage line 562. The contact 553 is electrically connected to the multiplexer 800. Hereinafter, a signal output from the contact 553 to the multiplexer 800 is referred to as a lower arm control signal LG.

When the second output signal OUT2 input from the matrix circuit 530 to the second switch 550 is at a low level, the contact 552 and the contact 553 are electrically connected, so that the lower arm control signal LG having the low-level voltage VLo is output from the contact 553 to the multiplexer 800. When the second output signal OUT2 input from the matrix circuit 530 to the second switch 550 is at a high level, the contact 551 and the contact 553 are electrically connected, so that the lower arm control signal LG having the high-level voltage VHi is output from the contact 553 to the multiplexer 800.

As described above, when both the upper arm 110 and the lower arm 120 are in a normal state, the alternative circuit 500 outputs the upper arm control signal HG having the low-level voltage VLo to the multiplexer 800 and outputs the lower arm control signal LG having the high-level voltage VHi to the multiplexer 800.

Further, when the upper arm 110 between the upper arm 110 and the lower arm 120 is in an abnormal state, the alternative circuit 500 outputs the upper arm control signal HG having the low-level voltage VLo to the multiplexer 800 and outputs the lower arm control signal LG having the high-level voltage VHi to the multiplexer 800.

Further, when the lower arm 120 between the upper arm 110 and the lower arm 120 is in an abnormal state, the alternative circuit 500 outputs the upper arm control signal HG having the high-level voltage VHi to the multiplexer 800 and outputs the lower arm control signal LG having the low-level voltage VLo to the multiplexer 800.

Furthermore, when both the upper arm 110 and the lower arm 120 are in an abnormal state, the alternative circuit 500 outputs the upper arm control signal HG having the low-level voltage VLo to the multiplexer 800 and outputs the lower arm control signal LG having the low-level voltage VLo to the multiplexer 800.

The first overvoltage detection circuit 610 outputs, to the OR circuit 700, a first overvoltage detection signal DV1 whose state changes depending on the magnitude of the inverter input voltage $V_{INV}$ which is an input voltage of the motor drive circuit 100. Specifically, the first overvoltage detection circuit 610 compares the inverter input voltage $V_{INV}$ input from the first separation circuit 210 with a second threshold $V_{TH2}$ higher than the first threshold $V_{TH1}$, and changes the state of the first overvoltage detection signal DV1 from a first state to a second state when the inverter input voltage $V_{INV}$ exceeds the second threshold $V_{TH2}$. In the present example embodiment, the first state is a high level, and the second state is a low level.

The second overvoltage detection circuit 620 outputs, to the OR circuit 700, a second overvoltage detection signal DV2 whose state changes depending on the magnitude of the inverter input voltage $V_{INV}$ which is an input voltage of the motor drive circuit 100. Specifically, the second overvoltage detection circuit 620 compares the inverter input voltage $V_{INV}$ input from the second separation circuit 220 with a third threshold $V_{TH3}$ higher than the second threshold $V_{TH2}$, and changes the state of the second overvoltage detection signal DV2 from the first state to the second state when the inverter input voltage $V_{INV}$ exceeds the third threshold $V_{TH3}$.

Each of the first overvoltage detection circuit 610 and the second overvoltage detection circuit 620 includes an analog comparison circuit including a comparator. That is, the second threshold $V_{TH2}$ and the third threshold $V_{TH3}$ are not digital data stored in a physical non-transitory memory like the first threshold $V_{TH1}$, but are analog voltages generated by, for example, a resistance voltage dividing circuit. In the first overvoltage detection circuit 610, the inverter input voltage $V_{INV}$ that is an analog voltage and the second threshold $V_{TH2}$ that is an analog voltage are input to a comparator, and an output signal of the comparator is output to the OR circuit 700 as the first overvoltage detection signal DV1. Similarly, in the second overvoltage detection circuit 620, the inverter input voltage $V_{INV}$ that is an analog voltage and the third threshold $V_{TH3}$ that is an analog voltage are input to a comparator, and an output signal of the comparator is output to the OR circuit 700 as the second overvoltage detection signal DV2.

The first threshold $V_{TH1}$, the second threshold $V_{TH2}$, and the third threshold $V_{TH3}$ are determined in a range from 470 V, which is a rated voltage of the high-voltage battery 7, to 700 V, which is a withstand voltage of the motor drive circuit 100. The first threshold $V_{TH1}$ is a voltage value higher than 470 V and lower than the second threshold $V_{TH2}$. The second threshold $V_{TH2}$ is a voltage value higher than the first threshold $V_{TH1}$ and lower than the third threshold $V_{TH3}$. The third threshold $V_{TH3}$ is a voltage value higher than the second threshold $V_{TH2}$ and lower than 700 V.

The OR circuit 700 is an OR circuit of the negative logic. The restart signal RST, the first abnormality detection signal FOT, and the second abnormality detection signal IOT output from the PMIC 400, the first overvoltage detection signal DV1 output from the first overvoltage detection circuit 610, and the second overvoltage detection signal DV2 output from the second overvoltage detection circuit 620 are input to the OR circuit 700. The OR circuit 700 calculates the OR of the restart signal RST, the first abnormality detection signal FOT, the second abnormality detection signal IOT, the first overvoltage detection signal DV1, and the second overvoltage detection signal DV2, and outputs a signal indicating a result of the calculation to the multiplexer 800 as a mode switching signal MS.

When at least one of the restart signal RST, the first abnormality detection signal FOT, the second abnormality detection signal IOT, the first overvoltage detection signal DV1, and the second overvoltage detection signal DV2 is at a low level, the mode switching signal MS at a low level is output from the OR circuit 700. Further, when all of the restart signal RST, the first abnormality detection signal FOT, the second abnormality detection signal IOT, the first overvoltage detection signal DV1, and the second overvoltage detection signal DV2 are at a high level, the mode switching signal MS at a high level is output from the OR circuit 700.

That is, when all of Conditions 1 to 3 described below are satisfied, the mode switching signal MS at a high level is output from the OR circuit 700.

(Condition 1) The PMIC 400 detects that the MCU 300 is in a normal state.

(Condition 2) The first overvoltage detection circuit 610 detects that the inverter input voltage $V_{INV}$ is equal to or less than the second threshold $V_{TH2}$.

(Condition 3) The second overvoltage detection circuit 620 detects that the inverter input voltage $V_{INV}$ is equal to or less than the third threshold $V_{TH3}$.

Further, when at least one of Conditions 4 to 6 described below is satisfied, the mode switching signal MS at a low level is output from the OR circuit 700.

(Condition 4) The PMIC 400 detects that the MCU 300 is in an abnormal state.

(Condition 5) The first overvoltage detection circuit 610 detects that the inverter input voltage $V_{INV}$ exceeds the second threshold $V_{TH2}$.

(Condition 6) The second overvoltage detection circuit 620 detects that the inverter input voltage $V_{INV}$ exceeds the third threshold $V_{TH3}$.

The mode switching signal MS output from the OR circuit 700, each timing signal output from the MCU 300, and the upper arm control signal HG and the lower arm control signal LG output from the alternative circuit 500 are input to the multiplexer 800. As described above, the timing signal output from the MCU 300 includes the U-phase upper timing signal HPU, the U-phase lower timing signal LPU, the V-phase upper timing signal HPV, the V-phase lower timing signal LPV, the W-phase upper timing signal HPW, and the W-phase lower timing signal LPW.

When the mode switching signal MS is at a high level, the multiplexer 800 outputs the U-phase upper timing signal HPU to the U-phase upper gate driver 111 as the U-phase upper gate control signal UHG, outputs the V-phase upper timing signal HPV to the V-phase upper gate driver 112 as the V-phase upper gate control signal VHG, and outputs the W-phase upper timing signal HPW to the W-phase upper gate driver 113 as the W-phase upper gate control signal WHG.

Further, when the mode switching signal MS is at a high level, the multiplexer 800 outputs the U-phase lower timing signal LPU to the U-phase lower gate driver 121 as the U-phase lower gate control signal ULG, outputs the V-phase lower timing signal LPV to the V-phase lower gate driver 122 as the V-phase lower gate control signal VLG, and outputs the W-phase lower timing signal LPW to the W-phase lower gate driver 123 as the W-phase lower gate control signal WLG.

When the mode switching signal MS is at a low level, the multiplexer 800 outputs the upper arm control signal HG to the U-phase upper gate driver 111 as the U-phase upper gate control signal UHG, outputs the upper arm control signal HG to the V-phase upper gate driver 112 as the V-phase upper gate control signal VHG, and outputs the upper arm control signal HG to the W-phase upper gate driver 113 as the W-phase upper gate control signal WHG.

Further, when the mode switching signal MS is at a low level, the multiplexer 800 outputs the lower arm control signal LG to the U-phase lower gate driver 121 as the U-phase lower gate control signal ULG, outputs the lower arm control signal LG to the V-phase lower gate driver 122 as the V-phase lower gate control signal VLG, and outputs the lower arm control signal LG to the W-phase lower gate driver 123 as the W-phase lower gate control signal WLG.

As described above, when the mode switching signal MS is at a high level, the motor drive circuit 100 is controlled by each timing signal output from the MCU 300. Hereinafter, the state in which the MCU 300 controls the motor drive circuit 100 as described above is referred to as a first control mode. Further, when the mode switching signal MS is at a low level, the motor drive circuit 100 is controlled by the upper arm control signal HG and the lower arm control signal LG output from the alternative circuit 500. Hereinafter, the state in which the alternative circuit 500 controls the motor drive circuit 100 as described above is referred to as a second control mode.

That is, the multiplexer 800 functions as a mode switching assembly that switches the control mode between the first control mode in which the MCU 300 controls the motor drive circuit 100 and the second control mode in which the alternative circuit 500 controls the motor drive circuit 100 on the basis of the state of the MCU 300, in other words, the state of the mode switching signal MS. The multiplexer 800 switches the control mode from the first control mode to the second control mode when the mode switching signal MS changes from a high level to a low level. Although details will be described later, in the second control mode, the alternative circuit 500 controls switching of the switching elements included in the upper arm 110 and the lower arm 120 on the basis of the state of the upper arm 110 and the lower arm 120. Specifically, the alternative circuit 500 performs, on the basis of the state of the upper arm 110 and the lower arm 120, either control in which all the switching elements included in one of the upper arm 110 and the lower arm 120 are set to be in an on state and all the switching elements included in the other are set to be in an off state (ASC control), or control in which all the switching elements included in both the upper arm 110 and the lower arm 120 are set to be in an off state (SD control).

Next, operation of the motor control device 40 configured as described above will be described.

First, the operation of the motor control device 40 at a normal time will be described. The normal time is when all of Conditions 1 to 3 described below are satisfied.

(Condition 1) The PMIC 400 detects that the MCU 300 is in a normal state.

(Condition 2) The first overvoltage detection circuit 610 detects that the inverter input voltage $V_{INV}$ is equal to or less than the second threshold $V_{TH2}$.

(Condition 3) The second overvoltage detection circuit 620 detects that the inverter input voltage $V_{INV}$ is equal to or less than the third threshold $V_{TH3}$.

When Condition 1 is satisfied, all of the restart signal RST, the first abnormality detection signal FOT, and the second abnormality detection signal IOT output from the PMIC 400 to the OR circuit 700 are at a high level. When Condition 2 is satisfied, the first overvoltage detection signal DV1 output from the first overvoltage detection circuit 610 to the OR circuit 700 is at a high level. When Condition 3 is satisfied, the second overvoltage detection signal DV2 output from the second overvoltage detection circuit 620 to the OR circuit 700 is at a high level. Therefore, when all of Conditions 1 to 3 are satisfied, the mode switching signal MS at a high level is output from the OR circuit 700 to the multiplexer 800. When the mode switching signal MS is at a high level, the control mode of the motor control device 40 is the first control mode in which the MCU 300 controls the motor drive circuit 100.

Figure 3:
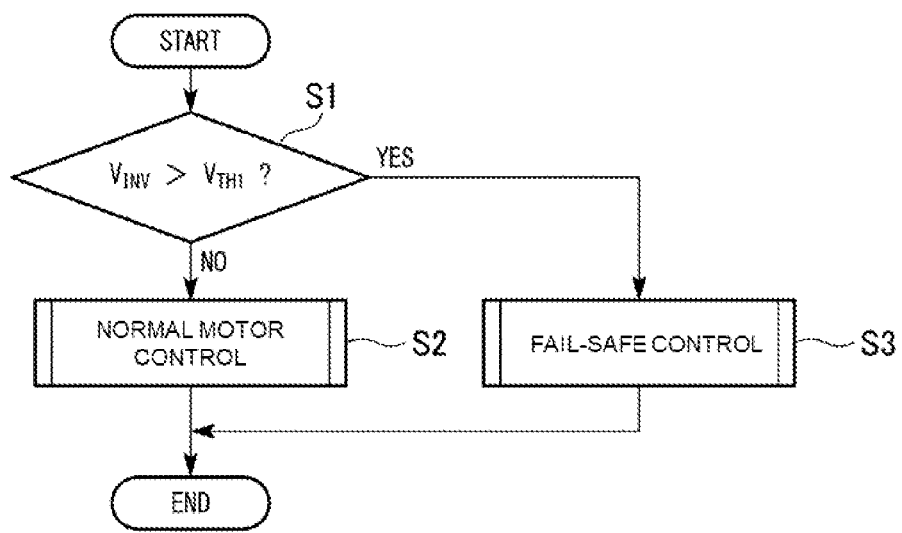
FIG. 3 is a flowchart showing motor control processing executed by an MCU according to a program stored in a non-transitory memory at a normal time.

FIG. 3 is a flowchart showing motor control processing executed by the MCU 300 according to a program stored in a physical non-transitory memory at the normal time. Note that the MCU 300 repeatedly executes the motor control process illustrated in FIG. 3 in a predetermined control cycle.

As illustrated in FIG. 3, first, the MCU 300 compares the inverter input voltage $V_{INV}$ input from the first separation circuit 210 via the overvoltage detection port 310 with the first threshold $V_{TH1}$, and determines whether or not the inverter input voltage $V_{INV}$ exceeds the first threshold $V_{TH1}$ (Step S1). Specifically, in Step S1, the MCU 300 determines whether or not the inverter input voltage $V_{INV}$ exceeds the first threshold $V_{TH1}$ by comparing the inverter input voltage $V_{INV}$ converted into digital data by the AD converter with the first threshold $V_{TH1}$ read from a physical non-transitory memory. Note that, as previously described, the first threshold $V_{TH1}$ is higher than 470 V that is the rated voltage of the high-voltage battery 7 and lower than the second threshold $V_{TH2}$.

When "No" in Step S1, that is, when the inverter input voltage $V_{INV}$ is equal to or less than the first threshold $V_{TH1}$, the MCU 300 performs normal motor control based on the motor control signal CS input from the electronic control device 5 (Step S2). In the present example embodiment, as the normal motor control, the MCU 300 performs vector control of three-phase current supplied from the motor drive circuit 100 to the motor 10 on the basis of the torque command value Tm* indicated by the motor control signal CS input from the electronic control device 5, thereby rotating the motor 10 with the torque determined by the torque command value Tm*. Since the vector control is generally known as a control system of the motor 10 which is a three-phase synchronous motor, in the present example embodiment, the vector control will be briefly described with reference to FIG. 4.

Figure 4:
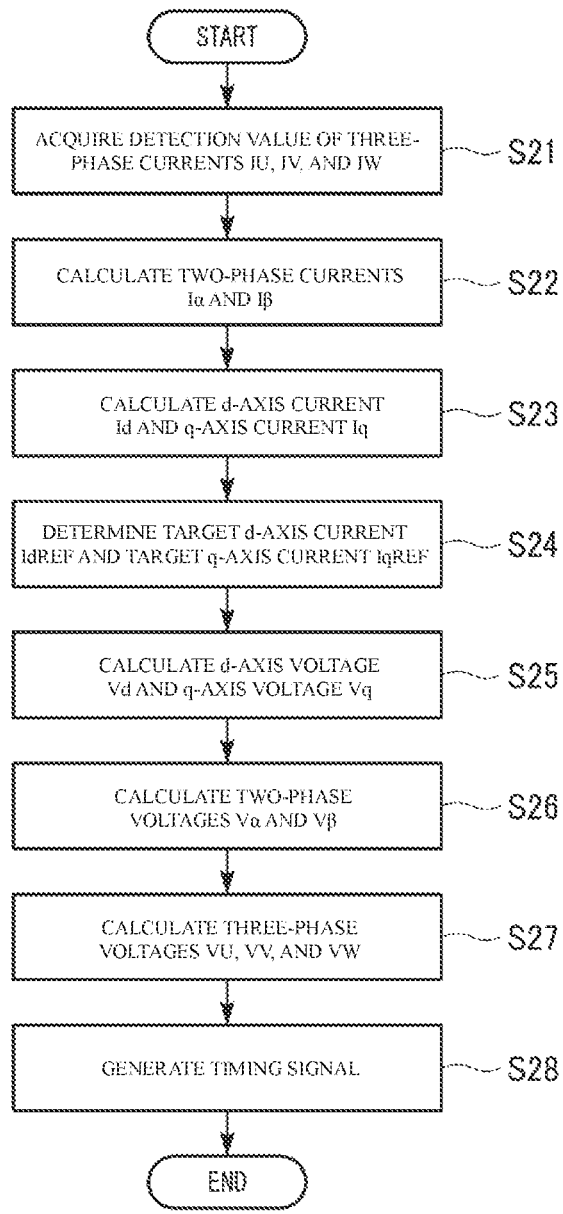
FIG. 4 is a flowchart showing vector control executed by the MCU as normal motor control.

FIG. 4 is a flowchart showing the vector control executed as the normal motor control by the MCU 300 in Step S2. As illustrated in FIG. 4, the MCU 300 acquires a detection value of three-phase current including U-phase current Iu, V-phase current Iv, and W-phase current Iw from a current sensor (not illustrated) such as a shunt resistor provided in the motor drive circuit 100 (Step S21).

Subsequently, the MCU 300 calculates two-phase currents Iα and Iβ in a fixed coordinate system by performing Clarke transformation on the detection values of the U-phase current Iu, the V-phase current Iv, and the W-phase current Iw (Step S22).

Subsequently, the MCU 300 converts the two-phase currents Iα and Iβ in the fixed coordinate system into a d-axis current Id and a q-axis current Iq in a rotating coordinate system by Park transformation based on Equations (1) and (2) (Step S23). Note that the MCU 300 acquires a detection value of the rotation angle $\theta_R$ of the motor 10 from a position detection device (not illustrated) such as a resolver attached to the motor 10 as "$\theta_R$" in Equations (1) and (2).

$$Id = I\alpha \cdot \cos\theta_R + I\beta \cdot \sin\theta_R \quad (1)$$

$$Iq = -I\alpha \cdot \sin\theta_R + I\beta \cdot \cos\theta_R \quad (2)$$

Subsequently, the MCU 300 determines a target d-axis current $Id_{REF}$ and a target q-axis current $Iq_{REF}$ on the basis of the torque command value Tm* (Step S24). In the physical non-transitory memory of the MCU 300, table data indicating the target d-axis current $Id_{REF}$ and the target q-axis current $Iq_{REF}$ corresponding to the torque command value Tm* is stored in advance. In Step S24, the MCU 300 reads the target d-axis current $Id_{REF}$ and the target q-axis current $Iq_{REF}$ corresponding to the torque command value Tm* indicated by the motor control signal CS from the table data stored in the physical non-transitory memory, so as to determine the target d-axis current $Id_{REF}$ and the target q-axis current $Iq_{REF}$.

Subsequently, the MCU 300 calculates a d-axis voltage Vd at which the deviation between the d-axis current Id and the target d-axis current $Id_{REF}$ becomes zero by PI computation, and calculates a q-axis voltage Vq at which the deviation between the q-axis current Iq and the target q-axis current $Iq_{REF}$ becomes zero by PI computation (Step S25).

Subsequently, the MCU 300 inversely converts the d-axis voltage Vd and the q-axis voltage Vq in the rotating coordinate system into two-phase voltages Vα and Vβ in the fixed coordinate system by inverse-Park transformation based on Equations (3) and (4) (Step S26). As "$\theta_R$" in Equations (3) and (4), a detection value of the rotation angle $\theta_R$ obtained from a position detection device (not illustrated) such as a resolver is used.

$$V\alpha = Vd \cdot \cos\theta_R - Vq \cdot \sin\theta_R \quad (3)$$

$$V\beta = Vd \cdot \sin\theta_R + Vq \cdot \cos\theta_R \quad (4)$$

Subsequently, the MCU 300 inversely converts the two-phase voltage values Vα and Vβ into three-phase voltages by space vector transformation (Step S27). The three-phase voltages include a U-phase voltage Vu, a V-phase voltage Vv, and a W-phase voltage Vw. Finally, the MCU 300 generates the U-phase upper timing signal HPU, the V-phase upper timing signal HPV, the W-phase upper timing signal HPW, the U-phase lower timing signal LPU, the V-phase lower timing signal LPV, and the W-phase lower timing signal LPW at which the three-phase voltages obtained by the space vector transformation described above are applied to the motor 10, and outputs the generated signals to the multiplexer 800 (Step S28).

When the mode switching signal MS is at a high level, the multiplexer 800 outputs the U-phase upper timing signal HPU input from the MCU 300 to the U-phase upper gate driver 111 as the U-phase upper gate control signal UHG, outputs the V-phase upper timing signal HPV input from the MCU 300 to the V-phase upper gate driver 112 as the V-phase upper gate control signal VHG, and outputs the W-phase upper timing signal HPW input from the MCU 300 to the W-phase upper gate driver 113 as the W-phase upper gate control signal WHG.

Further, when the mode switching signal MS is at a high level, the multiplexer 800 outputs the U-phase lower timing signal LPU input from the MCU 300 to the U-phase lower gate driver 121 as the U-phase lower gate control signal ULG, outputs the V-phase lower timing signal LPV input from the MCU 300 to the V-phase lower gate driver 122 as the V-phase lower gate control signal VLG, and outputs the W-phase lower timing signal LPW input from the MCU 300 to the W-phase lower gate driver 123 as the W-phase lower gate control signal WLG.

As described above, in a case where the inverter input voltage $V_{INV}$ is equal to or less than the first threshold $V_{TH1}$, the MCU 300 executes vector control as normal motor control on the basis of the motor control signal CS input from the electronic control device 5, so that each switching element included in the motor drive circuit 100 is subjected to switching control at an appropriate timing. As a result, the U-phase current Iu, the V-phase current Iv, and the W-phase current Iw supplied from the motor drive circuit 100 to the motor 10 are appropriately controlled, so that the motor 10 rotates with the torque determined by the torque command value Tm*, and a driving force requested by the driver is transmitted from the motor assembly 6 to the driving wheel 2.

Hereinafter, the description will be continued returning to FIG. 3. In a case of "Yes" in Step S1 of FIG. 3, that is, in a case where the inverter input voltage $V_{INV}$ exceeds the first threshold $V_{TH1}$, there is a high possibility that abnormality has occurred in the motor drive circuit 100, and a further increase in the inverter input voltage $V_{INV}$ leads to a failure of the switching element and the like. For this reason, the MCU 300 performs the fail-safe control based on the states of the upper arm 110 and the lower arm 120 (Step S3).

First, in Step S3, the MCU 300 determines whether the upper arm 110 and the lower arm 120 are in a normal state or an abnormal state. Specifically, when all of the fault signal FLT1 input from the U-phase upper gate driver 111, the fault signal FLT2 input from the V-phase upper gate driver 112, and the fault signal FLT3 input from the W-phase upper gate driver 113 are at a high level, the MCU 300 determines that the upper arm 110 is in a normal state. Further, in a case where at least one of the fault signals FLT1, FLT2, and FLT3 is at a low level, the MCU 300 determines that the upper arm 110 is in an abnormal state.

Further, in a case where all of the fault signal FLT4 input from the U-phase lower gate driver 121, the fault signal FLT5 input from the V-phase lower gate driver 122, and the fault signal FLT6 input from the W-phase lower gate driver 123 are at a high level, the MCU 300 determines that the lower arm 120 is in a normal state. Further, in a case where at least one of the fault signals FLT4, FLT 5, and FLT 6 is at a low level, the MCU 300 determines that the lower arm 120 is in an abnormal state.

Then, when determining that both the upper arm 110 and the lower arm 120 are in a normal state, the MCU 300 sets all of the U-phase upper timing signal HPU, the V-phase upper timing signal HPV, and the W-phase upper timing signal HSW to a low level and outputs the signals to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a low level.

Further, when determining that both the upper arm 110 and the lower arm 120 are in a normal state, the MCU 300 sets all of the U-phase lower timing signal LPU, the V-phase lower timing signal LPV, and the W-phase lower timing signal LPW to a high level and outputs the signals to the multiplexer 800. In this manner, all of the U-phase lower gate control signal ULG, the V-phase lower gate control signal VLG, and the W-phase lower gate control signal WLG output from the multiplexer 800 to the motor drive circuit 100 are at a high level.

As a result, in a case where both the upper arm 110 and the lower arm 120 are in a normal state, all the switching elements included in the upper arm 110 are controlled to an off state, and all the switching elements included in the lower arm 120 are controlled to an on state. In other words, when determining that both the upper arm 110 and the lower arm 120 are in a normal state, the MCU 300 executes the ASC control for controlling all the switching elements included in the upper arm 110 to an off state and controlling all the switching elements included in the lower arm 120 to an on state. In this manner, current passing through all the switching elements included in the upper arm 110 is cut off, and a counter electromotive force generated by the motor 10 flows back in a closed circuit including the lower arm 120. In this manner, a further increase in the inverter input voltage $V_{INV}$ and further acceleration of the motor 10 can be prevented, and damage to the switching element and the high-voltage battery 7 can be prevented.

When determining that the upper arm 110 between the upper arm 110 and the lower arm 120 is in an abnormal state, the MCU 300 sets all of the U-phase upper timing signal HPU, the V-phase upper timing signal HPV, and the W-phase upper timing signal HSW to a low level and outputs the signals to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a low level.

Further, when determining that the upper arm 110 between the upper arm 110 and the lower arm 120 is in an abnormal state, the MCU 300 sets all of the U-phase lower timing signal LPU, the V-phase lower timing signal LPV, and the W-phase lower timing signal LPW to a high level and outputs the signals to the multiplexer 800. In this manner, all of the U-phase lower gate control signal ULG, the V-phase lower gate control signal VLG, and the W-phase lower gate control signal WLG output from the multiplexer 800 to the motor drive circuit 100 are at a high level.

As a result, in a case where the upper arm 110 between the upper arm 110 and the lower arm 120 is in an abnormal state, all the switching elements included in the upper arm 110 are controlled to an off state, and all the switching elements included in the lower arm 120 are controlled to an on state. In other words, when determining that the upper arm 110 between the upper arm 110 and the lower arm 120 is in an abnormal state, the MCU 300 executes the ASC control to control all the switching elements included in the upper arm 110 to an off state and control all the switching elements included in the lower arm 120 to an on state. In this manner, current passing through all the switching elements included in the upper arm 110 is cut off, and a counter electromotive force generated by the motor 10 flows back in a closed circuit including the lower arm 120. In this manner, a further increase in the inverter input voltage $V_{INV}$ and further acceleration of the motor 10 can be prevented, and damage to the switching element and the high-voltage battery 7 can be prevented.

When determining that the lower arm 120 between the upper arm 110 and the lower arm 120 is in an abnormal state, the MCU 300 sets all of the U-phase upper timing signal HPU, the V-phase upper timing signal HPV, and the W-phase upper timing signal HSW to a high level and outputs the signals to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a high level.

Further, when determining that the lower arm 120 between the upper arm 110 and the lower arm 120 is in an abnormal state, the MCU 300 sets all of the U-phase lower timing signal LPU, the V-phase lower timing signal LPV, and the W-phase lower timing signal LPW to a low level and outputs the signals to the multiplexer 800. In this manner, all of the U-phase lower gate control signal ULG, the V-phase lower gate control signal VLG, and the W-phase lower gate control signal WLG output from the multiplexer 800 to the motor drive circuit 100 are at a low level.

As a result, in a case where the lower arm 120 between the upper arm 110 and the lower arm 120 is in an abnormal state, all the switching elements included in the upper arm 110 are controlled to an on state, and all the switching elements included in the lower arm 120 are controlled to an off state. In other words, when determining that the lower arm 120 between the upper arm 110 and the lower arm 120 is in an abnormal state, the MCU 300 executes the ASC control to control all the switching elements included in the upper arm 110 to an on state and control all the switching elements included in the lower arm 120 to an off state. In this manner, current passing through all the switching elements included in the lower arm 120 is cut off, and a counter electromotive force generated by the motor 10 flows back in a closed circuit including the upper arm 110. In this manner, a further increase in the inverter input voltage $V_{INV}$ and further acceleration of the motor 10 can be prevented, and damage to the switching element and the high-voltage battery 7 can be prevented.

When determining that both the upper arm 110 and the lower arm 120 are in an abnormal state, the MCU 300 sets all of the U-phase upper timing signal HPU, the V-phase upper timing signal HPV, and the W-phase upper timing signal HSW to a low level and outputs the signals to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a low level.

Further, when determining that both the upper arm 110 and the lower arm 120 are in an abnormal state, the MCU 300 sets all of the U-phase lower timing signal LPU, the V-phase lower timing signal LPV, and the W-phase lower timing signal LPW to a low level and outputs the signals to the multiplexer 800. In this manner, all of the U-phase lower gate control signal ULG, the V-phase lower gate control signal VLG, and the W-phase lower gate control signal WLG output from the multiplexer 800 to the motor drive circuit 100 are at a low level.

As a result, in a case where both the upper arm 110 and the lower arm 120 are in an abnormal state, all the switching elements included in the upper arm 110 are controlled to an off state, and all the switching elements included in the lower arm 120 are controlled to an off state. In other words, when determining that both the upper arm 110 and the lower arm 120 are in an abnormal state, the MCU 300 executes the SD control for controlling all the switching elements included in the upper arm 110 to an off state and controlling all the switching elements included in the lower arm 120 to an off state. In this manner, since the counter electromotive force generated by the rotation of the motor 10 flows to the high-voltage battery 7 via the freewheel diode of each switching element, the switching element can be protected.

The operation of the motor control device 40 at the normal time is described above. Next, the operation of the motor control device 40 at the time of abnormality will be described. The time of abnormality means that at least one of Conditions 4 to 6 described below is satisfied.

(Condition 4) The PMIC 400 detects that the MCU 300 is in an abnormal state.

(Condition 5) The first overvoltage detection circuit 610 detects that the inverter input voltage $V_{INV}$ exceeds the second threshold $V_{TH2}$.

(Condition 6) The second overvoltage detection circuit 620 detects that the inverter input voltage $V_{INV}$ exceeds the third threshold $V_{TH3}$.

When Condition 4 is satisfied, at least one of the restart signal RST, the first abnormality detection signal FOT, and the second abnormality detection signal IOT output from the PMIC 400 to the OR circuit 700 is at a low level. When Condition 5 is satisfied, the first overvoltage detection signal DV1 output from the first overvoltage detection circuit 610 to the OR circuit 700 is at a low level. When Condition 6 is satisfied, the second overvoltage detection signal DV2 output from the second overvoltage detection circuit 620 to the OR circuit 700 is at a low level. Therefore, when at least one of Conditions 4 to 6 is satisfied, the mode switching signal MS at a low level is output from the OR circuit 700 to the multiplexer 800. When the mode switching signal MS is at a low level, the control mode of the motor control device 40 is the second control mode in which the alternative circuit 500 controls the motor drive circuit 100.

In the second control mode, the alternative circuit 500 executes the fail-safe control based on the states of the upper arm 110 and the lower arm 120. As previously described, when both the upper arm 110 and the lower arm 120 are in a normal state, the alternative circuit 500 outputs the upper arm control signal HG having the low-level voltage VLo to the multiplexer 800 and outputs the lower arm control signal LG having the high-level voltage VHi to the multiplexer 800.

When the mode switching signal MS is at a low level, the multiplexer 800 outputs the upper arm control signal HG to the U-phase upper gate driver 111 as the U-phase upper gate control signal UHG, outputs the upper arm control signal HG to the V-phase upper gate driver 112 as the V-phase upper gate control signal VHG, and outputs the upper arm control signal HG to the W-phase upper gate driver 113 as the W-phase upper gate control signal WHG.

Further, when the mode switching signal MS is at a low level, the multiplexer 800 outputs the lower arm control signal LG to the U-phase lower gate driver 121 as the U-phase lower gate control signal ULG, outputs the lower arm control signal LG to the V-phase lower gate driver 122 as the V-phase lower gate control signal VLG, and outputs the lower arm control signal LG to the W-phase lower gate driver 123 as the W-phase lower gate control signal WLG.

Therefore, when both the upper arm 110 and the lower arm 120 are in a normal state, all of the U-phase upper gate control signal UHG, the V-phase upper gate control signal VHG, and the W-phase upper gate control signal WHG output from the multiplexer 800 to the motor drive circuit 100 are at a low level, and all of the U-phase lower gate control signal ULG, the V-phase lower gate control signal VLG, and the W-phase lower gate control signal WLG output from the multiplexer 800 to the motor drive circuit 100 are at a high level.

As a result, in a case where both the upper arm 110 and the lower arm 120 are in a normal state, all the switching elements included in the upper arm 110 are controlled to an off state, and all the switching elements included in the lower arm 120 are controlled to an on state. In other words, when both the upper arm 110 and the lower arm 120 are in a normal state, the alternative circuit 500 executes the ASC control for controlling all the switching elements included in the upper arm 110 to an off state and controlling all the switching elements included in the lower arm 120 to an on state. In this manner, current passing through all the switching elements included in the upper arm 110 is cut off, and a counter electromotive force generated by the motor 10 flows back in a closed circuit including the lower arm 120. In this manner, a further increase in the inverter input voltage $V_{INV}$ and further acceleration of the motor 10 can be prevented, and damage to the switching element and the high-voltage battery 7 can be prevented.

When the upper arm 110 between the upper arm 110 and the lower arm 120 is in an abnormal state, the alternative circuit 500 outputs the upper arm control signal HG having the low-level voltage VLo to the multiplexer 800 and outputs the lower arm control signal LG having the high-level voltage VHi to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a low level, and all of the U-phase lower gate control signal ULG, the V-phase lower gate control signal VLG, and the W-phase lower gate control signal WLG output from the multiplexer 800 to the motor drive circuit 100 are at a high level.

As a result, in a case where the upper arm 110 between the upper arm 110 and the lower arm 120 is in an abnormal state, all the switching elements included in the upper arm 110 are controlled to an off state, and all the switching elements included in the lower arm 120 are controlled to an on state. In other words, when the upper arm 110 between the upper arm 110 and the lower arm 120 is in an abnormal state, the alternative circuit 500 executes the ASC control to control all the switching elements included in the upper arm 110 to an off state and control all the switching elements included in the lower arm 120 to an on state. In this manner, current passing through all the switching elements included in the upper arm 110 is cut off, and a counter electromotive force generated by the motor 10 flows back in a closed circuit including the lower arm 120. In this manner, a further increase in the inverter input voltage $V_{INV}$ and further acceleration of the motor 10 can be prevented, and damage to the switching element and the high-voltage battery 7 can be prevented.

When the lower arm 120 between the upper arm 110 and the lower arm 120 is in an abnormal state, the alternative circuit 500 outputs the upper arm control signal HG having the high-level voltage VHi to the multiplexer 800 and outputs the lower arm control signal LG having the low-level voltage VLo to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a high level, and all of the U-phase lower gate control signal ULG, the V-phase lower gate control signal VLG, and the W-phase lower gate control signal WLG output from the multiplexer 800 to the motor drive circuit 100 are at a low level.

As a result, in a case where the lower arm 120 between the upper arm 110 and the lower arm 120 is in an abnormal state, all the switching elements included in the upper arm 110 are controlled to an on state, and all the switching elements included in the lower arm 120 are controlled to an off state. In other words, when the lower arm 120 between the upper arm 110 and the lower arm 120 is in an abnormal state, the alternative circuit 500 executes the ASC control to control all the switching elements included in the upper arm 110 to an on state and control all the switching elements included in the lower arm 120 to an off state. In this manner, current passing through all the switching elements included in the lower arm 120 is cut off, and a counter electromotive force generated by the motor 10 flows back in a closed circuit including the upper arm 110. In this manner, a further increase in the inverter input voltage $V_{INV}$ and further acceleration of the motor 10 can be prevented, and damage to the switching element and the high-voltage battery 7 can be prevented.

When both the upper arm 110 and the lower arm 120 are in an abnormal state, the alternative circuit 500 outputs the upper arm control signal HG having the low-level voltage VLo to the multiplexer 800 and outputs the lower arm control signal LG having the low-level voltage VLo to the multiplexer 800. In this manner, all of the U-phase upper gate control signal UHG, the V-phase upper gate control signal VHG, and the W-phase upper gate control signal WHG output from the multiplexer 800 to the motor drive circuit 100 are at a low level, and all of the U-phase lower gate control signal ULG, the V-phase lower gate control signal VLG, and the W-phase lower gate control signal WLG output from the multiplexer 800 to the motor drive circuit 100 are at a low level.

As a result, in a case where both the upper arm 110 and the lower arm 120 are in an abnormal state, all the switching elements included in the upper arm 110 are controlled to an off state, and all the switching elements included in the lower arm 120 are controlled to an off state. In other words, when both the upper arm 110 and the lower arm 120 are in an abnormal state, the alternative circuit 500 executes the SD control for controlling all the switching elements included in the upper arm 110 to an off state and controlling all the switching elements included in the lower arm 120 to an off state. In this manner, since the counter electromotive force generated by the rotation of the motor 10 flows to the high-voltage battery 7 via the freewheel diode of each switching element, the switching element can be protected.

As described above, the motor control device 40 according to the present example embodiment includes the motor drive circuit 100 having the upper arm 110 and the lower arm 120, the MCU 300 that controls the motor drive circuit 100, the alternative circuit 500 that substitutes for the MCU 300, and the multiplexer 800 that switches the control mode between the first control mode and the second control mode on the basis of the state of the MCU 300. The multiplexer 800 switches the control mode from the first control mode to the second control mode when the state of the MCU 300 changes from a normal state to an abnormal state. In the second control mode, the alternative circuit 500 performs the fail-safe control based on the states of the upper arm 110 and the lower arm 120.

According to the present example embodiment, it is possible to execute the fail-safe control by the substitute circuit 500 when an abnormality occurs in the MCU 300. Further, it is possible to execute appropriate fail-safe control based on the states of the upper arm 110 and the lower arm 120.

The motor control device 40 in the present example embodiment further includes the monitor (PMIC 400) that monitors the state of the MCU 300. The multiplexer 800 switches the control mode from the first control mode to the second control mode when the monitor detects that the state of the MCU 300 changes from a normal state to an abnormal state.

In a control device using an arithmetic processing device such as the MCU 300, it is common to provide a monitoring circuit that monitors a state of the arithmetic processing device. Therefore, if an existing monitoring circuit is used as the monitor of the present disclosure, it is not necessary to add a new component for the monitor, and the present disclosure can be realized at low cost.

In the present example embodiment, the monitor (PMIC 400) is provided separately from the MCU 300. In this manner, even if an abnormality occurs in the MCU 300, which is an arithmetic processing device, the monitor can be prevented from being affected by the abnormality.

In the present example embodiment, the monitor is the PMIC 400 that performs power management of the MCU 300.

By using the PMIC 400 which is a power management IC of the MCU 300 as the monitor, it is possible to realize the present disclosure at low cost without newly providing a circuit corresponding to the monitor.

The motor control device 40 in the present example embodiment further includes the first overvoltage detection circuit 610 that outputs the first overvoltage detection signal DV1 whose state changes depending on the magnitude of the input voltage (inverter input voltage $V_{INV}$) of the motor drive circuit 100. The MCU 300 compares the inverter input voltage $V_{INV}$ with the first threshold $V_{TH1}$, and performs the fail-safe control when the inverter input voltage $V_{INV}$ exceeds the first threshold $V_{TH1}$. The first overvoltage detection circuit 610 compares the inverter input voltage $V_{INV}$ with the second threshold $V_{TH2}$ higher than the first threshold $V_{TH1}$, and changes the state of the first overvoltage detection signal DV1 from a high level to a low level when the inverter input voltage $V_{INV}$ exceeds the second threshold $V_{TH2}$. The multiplexer 800 switches the control mode from the first control mode to the second control mode also when the state of the first overvoltage detection signal DV1 changes from a high level to a low level.

As usual, when the MCU 300 performs the fail-safe control at a time point at which an overvoltage exceeding the first threshold is generated to suppress an increase in the inverter input voltage. However, in a case where a large overvoltage exceeding the second threshold is generated, there is a high possibility that the fail-safe control by the MCU 300 is not functioning correctly. In such a case, switching is made to the second control mode and the fail-safe control by the alternative circuit 500 is performed, so that the fail-safe control can be continued regardless of the state of the MCU 300. Further even in a case where the alternative circuit 500 is used, appropriate fail-safe control based on the states of the upper arm 110 and the lower arm 120 can be executed.

The motor control device 40 in the present example embodiment further includes the second overvoltage detection circuit 620 that outputs the second overvoltage detection signal DV2 whose state changes depending on the magnitude of the input voltage (inverter input voltage $V_{INV}$) of the motor drive circuit 100. The second overvoltage detection circuit 620 compares the inverter input voltage $V_{INV}$ with the third threshold $V_{TH3}$ higher than the second threshold $V_{TH2}$, and changes the state of the second overvoltage detection signal DV2 from a high level to a low level when the inverter input voltage $V_{INV}$ exceeds the third threshold $V_{TH3}$. The multiplexer 800 switches the control mode from the first control mode to the second control mode when at least one of the first overvoltage detection signal DV1 and the second overvoltage detection signal DV2 changes from a high level to a low level. Normally, at a time point at which the first threshold or the second threshold is detected, increase in the inverter input voltage is suppressed by the fail-safe control by the MCU 300 or the first overvoltage detection circuit 610. However, in a case where a large overvoltage exceeding the third threshold is generated, there is a high possibility that the fail-safe control by the MCU 300 or the first overvoltage detection circuit 610 is not functioning correctly. In such a case, switching is made to the second control mode and the fail-safe control by the alternative circuit 500 is performed, so that the fail-safe control can be continued regardless of the state of the MCU 300 or the first overvoltage detection circuit 610. That is, as compared with a case where only the first overvoltage detection circuit 610 is provided, the possibility that the fail-safe control can be executed is increased when the second overvoltage detection circuit 620 is further provided, and the safety is improved. Further even in a case where the alternative circuit 500 is used, appropriate fail-safe control based on the states of the upper arm 110 and the lower arm 120 can be executed.

In the present example embodiment, in a case where both the upper arm 110 and the lower arm 120 are in a normal state, the alternative circuit 500 controls all the switching elements included in the upper arm 110 to an off state and controls all the switching elements included in the lower arm 120 to an on state.

In this manner, in a case where both the upper arm 110 and the lower arm 120 are in a normal state, appropriate fail-safe control can be performed by the alternative circuit 500.

In the present example embodiment, in a case where the upper arm 110, between the upper arm 110 and the lower arm 120, is in an abnormal state, the alternative circuit 500 controls all the switching elements included in the upper arm 110 to an off state and controls all the switching elements included in the lower arm 120 to an on state.

In this manner, in a case where the upper arm 110 between the upper arm 110 and the lower arm 120 is in an abnormal state, appropriate fail-safe control can be performed by the alternative circuit 500.

In the present example embodiment, in a case where the lower arm 120, between the upper arm 110 and the lower arm 120, is in an abnormal state, the alternative circuit 500 controls all the switching elements included in the upper arm 110 to an on state and controls all the switching elements included in the lower arm 120 to an off state.

In this manner, in a case where the lower arm 120 between the upper arm 110 and the lower arm 120 is in an abnormal state, appropriate fail-safe control can be performed by the alternative circuit 500.

In the present example embodiment, in a case where both the upper arm 110 and the lower arm 120 are in an abnormal state, the alternative circuit 500 controls all the switching elements included in the upper arm 110 to an off state and controls all the switching elements included in the lower arm 120 to an off state.

In this manner, in a case where both the upper arm 110 and the lower arm 120 are in an abnormal state, appropriate fail-safe control can be performed by the alternative circuit 500.

In the present example embodiment, the alternative circuit 500 determines whether the upper arm 110 and the lower arm 120 are in a normal state or an abnormal state on the basis of an abnormality detection signal (fault signal) output from each gate driver of the motor drive circuit 100.

In this manner, it is possible to determine whether the upper arm 110 and the lower arm 120 are in a normal state or an abnormal state more accurately than a case where the fault signal of the gate driver is not used.

The present disclosure is not limited to the above example embodiment, and the configurations described in the present specification can be appropriately combined within a range not contradictory to each other.

For example, in the above example embodiment, the PMIC 400 serving as the monitor is provided separately from the MCU 300 serving as the arithmetic processing device. However, the present disclosure is not limited to this, and the monitor may be provided in the arithmetic processing device, or both the arithmetic processing device including the monitor and the monitor provided separately from the arithmetic processing device may be included.

Further, in a case where the monitor is arranged inside the arithmetic processing device, the control mode may be switched by operation of the mode switching assembly (multiplexer 800) using a signal for notifying abnormality output from the arithmetic processing device as a trigger.

Further, in the above example embodiment, the PMIC 400 is exemplified as the monitor provided separately from the arithmetic processing device. However, the present disclosure is not limited to this, and an electronic device having a function of monitoring a state of the arithmetic processing device may be used as the monitor.

In the above example embodiment, as the motor assembly including the motor control device 40, the motor assembly 6 that applies a driving force to the driving wheel 2 of the vehicle 1 that is an electric car is exemplified. However, the present disclosure is not limited to this, and the motor control device of the present disclosure may be included in another motor assembly.

Further, in the above example embodiment, the case where the motor assembly 6 including the motor control device 40 is mounted on the vehicle 1 that is an electric car is exemplified. However, the motor assembly of the present disclosure can be applied to a vehicle other than an electric car, a device that requires a rotational force of a motor, or the like.

In the above example embodiment, the motor assembly 6 includes one of the motor 10 and the motor drive circuit 100, and the motor drive circuit 100 includes six switching elements in the upper arm and the lower arm combined. However, the present disclosure is not limited to this. The configuration may be such that the motor assembly 6 includes a generator motor separately from the motor 10, and the motor drive circuit 100 includes six switching elements for driving the generator motor in addition to the six switching elements for driving the motor 10. Further, the configuration may be such that the fail-safe control of the present disclosure can be executed on the switching element that drives the generator motor.

In the above example embodiment, regarding the operation of the motor control device 40 when the MCU 300 is in a normal state, the fail-safe control is started when overvoltage of the inverter input voltage is detected. However, the present disclosure is not limited to this. The configuration may be such that a rotation speed detection unit that detects a rotation speed of the motor 10 is provided, and the fail-safe control is started when the rotation speed detection unit detects a rotation speed exceeding an optional threshold.

In the above example embodiment, regarding the operation of the motor control device 40 at the time of abnormality of the MCU 300, the configuration in which the control mode is switched from the first control mode to the second control mode by output of the mode switching signal MS at a low level to the multiplexer 800 when overvoltage of the inverter input voltage or abnormality of the MCU 300 is detected so that the fail-safe control is performed is exemplified. However, the present disclosure is not limited to this. The configuration may be such that a rotation speed detection unit that detects a rotation speed of the motor 10 is provided, and the control mode is switched from the first control mode to the second control mode by output of the mode switching signal MS at a low level to the multiplexer 800 when the rotation speed detection unit detects a rotation speed exceeding an optional threshold, so that the fail-safe control is performed.

In the above example embodiment, the configuration in which the motor assembly 6 inputs power to the motor drive circuit 100 without increasing or decreasing the voltage of the high-voltage battery 7 is exemplified. However, the present disclosure is not limited to this. The motor assembly 6 may include a DC-DC converter that increases or decreases voltage of the high-voltage battery 7.

In the above example embodiment, the configuration may be such that the inverter input voltage, a rotation speed of the motor 10, a state of the MCU 300, and the like after the fail-safe control is executed are detected. The configuration may be such that, for example, after the fail-safe control, in a case where the inverter device changes from a low safety state to a high safety state, such as when it is detected that the inverter input voltage or the motor rotational speed returns to a predetermined threshold or less, or when it is detected that the MCU 300 returns from an abnormal state to a normal state, the fail-safe control is finished even if the rotation of the motor 10 is not stopped, and the switching control returns to that at the normal time.

In the above example embodiment, the configuration may be such that the gate control signal output from the multiplexer 800 is monitored so that a short-circuit state of the motor drive circuit 100 is prevented. For example, in a case where both the U-phase upper gate control signal UHG and the U-phase lower gate control signal ULG are at a high level, both the U-phase upper switching element $Q_{UH}$ and the U-phase lower switching element $Q_{UH}$ are in an on state, and the motor drive circuit 100 is short-circuited. The configuration may be such that, when it is detected that the gate control signals are output at a high level in both the upper and lower arms in the same phase as described above, the supply of the gate control signal to the motor drive circuit 100 is stopped, or all the switching elements are set to off.

In the above example embodiment, all of the OR circuit 700, the first OR circuit 510, and the second OR circuit 520 are OR circuits of the negative logic. However, these circuits may be OR circuits of the positive logic. Furthermore, the logic of each signal may be reversed, and, for example, operation described below may be executed. In a case where at least one high-level signal is input to the OR circuit 700 of the positive logic, the control mode is switched from the first control mode to the second control mode by output of the mode switching signal MS at a high level to the multiplexer 800. When the switching element included in the upper arm 110 is abnormal, at least one of three upper gate drivers outputs an FLT signal at a high level to the first OR circuit 510 of the positive logic. The first logic circuit 510 of the positive logic outputs the upper arm fault signal FLTH at a high level to the matrix circuit 530. The matrix circuit 530 outputs the first output signal OUT1 at a high level to the first switch 540. In the first switch 540, the contact 541 and the contact 543 are electrically connected, so that the upper arm control signal HG having the high-level voltage VHi is output from the contact 543 to the multiplexer 800. The multiplexer 800 outputs the U-phase upper gate control signal UHG, the V-phase upper gate control signal VHG, and the W-phase upper gate control signal WHG, all of which are set at a high level, to three upper gate drivers.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device, comprising:
a motor drive circuit including an upper arm and a lower arm;
an arithmetic processor to control the motor drive circuit;
an alternative circuit that can operate as a substitute to replace the arithmetic processor; and
a mode switch to switch a control mode between a first control mode, in which the arithmetic processor controls the motor drive circuit, and a second control mode, in which the alternative circuit controls the motor drive circuit, based on a state of the arithmetic processor; wherein
the mode switch switches the control mode from the first control mode to the second control mode when a state of the arithmetic processor changes from a normal state to an abnormal state; and
in the second control mode, the alternative circuit controls switching of switches included in the upper arm and the lower arm based on a state of the upper arm and the lower arm.

2. The motor control device according to claim 1, further comprising a monitor to monitor a state of the arithmetic processor; wherein
the mode switch switches the control mode from the first control mode to the second control mode when the monitor detects that a state of the arithmetic processor changes from a normal state to an abnormal state.

3. The motor control device according to claim 2, wherein the monitor is provided separately from the arithmetic processor.

4. The motor control device according to claim 2, wherein the monitor is a power management integrated circuit to perform power management of the arithmetic processor.

5. The motor control device according to claim 1, further comprising a first overvoltage detection circuit to output a first overvoltage detection signal with a state that changes depending on a magnitude of an input voltage of the motor drive circuit; wherein the arithmetic processor compares an input voltage of the motor drive circuit with a first threshold, and executes fail-safe control when the input voltage exceeds the first threshold;

the first overvoltage detection circuit compares an input voltage of the motor drive circuit with a second threshold higher than the first threshold, and changes a state of the first overvoltage detection signal from a first state to a second state when the input voltage exceeds the second threshold; and the mode switch switches the control mode from the first control mode to the second control mode also when a state of the first overvoltage detection signal changes from the first state to the second state.

6. The motor control device according to claim 5, further comprising a second overvoltage detection circuit to output a second overvoltage detection signal with a state that changes depending on a magnitude of an input voltage of the motor drive circuit; wherein the second overvoltage detection circuit compares an input voltage of the motor drive circuit with a third threshold higher than the second threshold, and changes a state of the second overvoltage detection signal from a first state to a second state when the input voltage exceeds the third threshold; and the mode switch switches the control mode from the first control mode to the second control mode when at least one of the first overvoltage detection signal and the second overvoltage detection signal changes from the first state to the second state.

7. The motor control device according to claim 1, wherein in a case where both the upper arm and the lower arm are in a normal state, the alternative circuit controls all switches included in the upper arm to an off state and controls all the switches included in the lower arm to an on state.

8. The motor control device according to claim 7, wherein the alternative circuit determines whether the upper arm and the lower arm are in a normal state or an abnormal state, based on an abnormality detection signal output from a gate driver of the motor drive circuit.

9. The motor control device according to claim 1, wherein in a case where the upper arm between the upper arm and the lower arm is in an abnormal state, the alternative circuit controls all switches included in the upper arm to an off state and controls all the switches included in the lower arm to an on state.

10. The motor control device according to claim 1, wherein in a case where the lower arm between the upper arm and the lower arm is in an abnormal state, the alternative circuit controls all switches included in the upper arm to an on state and controls all the switches included in the lower arm to an off state.

11. The motor control device according to claim 1, wherein in a case where both the upper arm and the lower arm are in an abnormal state, the alternative circuit controls all switches included in the upper arm to an off state and controls all the switches included in the lower arm to an off state.

12. A motor assembly comprising:
a motor; and
the motor control device according to claim 1 that controls the motor.

13. A vehicle comprising the motor assembly according to claim 12.

14. A motor control device comprising:
a motor drive circuit including an upper arm and a lower arm;
an arithmetic processor to control the motor drive circuit;
an alternative circuit that can operate as a substitute to replace the arithmetic processor;
a first overvoltage detection circuit to output a first overvoltage detection signal with a state that changes depending on a magnitude of an input voltage of the motor drive circuit; and
a mode switch to switch a control mode between a first control mode, in which the arithmetic processor controls the motor drive circuit, and a second control mode, in which the alternative circuit controls the motor drive circuit, based on a state of the first overvoltage detection signal; wherein the arithmetic processor compares an input voltage of the motor drive circuit with a first threshold, and executes fail-safe control when the input voltage exceeds the first threshold;

the first overvoltage detection circuit compares an input voltage of the motor drive circuit with a second threshold higher than the first threshold, and changes a state of the first overvoltage detection signal from a first state to a second state when the input voltage exceeds the second threshold;

the mode switch switches the control mode from the first control mode to the second control mode when a state of the first overvoltage detection signal changes from the first state to the second state; and in the second control mode, the alternative circuit controls switching of switches included in the upper arm and the lower arm based on a state of the upper arm and the lower arm.

15. The motor control device according to claim 14, further comprising a second overvoltage detection circuit to output a second overvoltage detection signal with a state that changes depending on a magnitude of an input voltage of the motor drive circuit; wherein the second overvoltage detection circuit compares an input voltage of the motor drive circuit with a third threshold higher than the second threshold, and changes a state of the second overvoltage detection signal from a first state to a second state when the input voltage exceeds the third threshold; and the mode switch switches the control mode from the first control mode to the second control mode when at least one of the first overvoltage detection signal and the second overvoltage detection signal changes from the first state to the second state.

16. The motor control device according to claim 14, wherein the mode switch switches the control mode from the first control mode to the second control mode also when a state of the arithmetic processor changes from a normal state to an abnormal state.

17. The motor control device according to claim 16, further comprising a monitor to monitor a state of the arithmetic processor; wherein the mode switch switches the control mode from the first control mode to the second control mode when the monitor detects that a state of the arithmetic processor changes from a normal state to an abnormal state.

18. The motor control device according to claim 17, wherein the monitor is provided separately from the arithmetic processor.

19. The motor control device according to claim 17, wherein the monitor is a power management integrated circuit to perform power management of the arithmetic processor.

\* \* \* \* \*